United States Patent [19]

Richman et al.

[11] Patent Number: 5,014,502

[45] Date of Patent: May 14, 1991

[54] DOFFER ASSEMBLY FOR A HARVESTING UNIT OF A COTTON HARVESTER

[75] Inventors: Kevin S. Richman, Aurora; Jesse H. Orsborn, Hinsdale, both of Ill.

[73] Assignee: J. I. Case Company, Racine, Wis.

[21] Appl. No.: 510,939

[22] Filed: Apr. 19, 1990

[51] Int. Cl.⁵ .............................................. A01D 46/14
[52] U.S. Cl. .......................................... 56/41; 56/45; 403/337
[58] Field of Search ..................................... 56/33-36, 56/40, 41, 44, 45, 50, 370.1, DIG. 24; 220/342, 343; 49/397; 403/335, 337, 296

[56] References Cited

U.S. PATENT DOCUMENTS

| | | | |
|---|---|---|---|
| 2,654,202 | 10/1953 | Millard | 56/41 |
| 2,664,688 | 1/1954 | Nickla | 56/41 |
| 2,664,689 | 1/1954 | Walker et al. | 56/41 |
| 3,014,332 | 12/1961 | Hubbard | 56/41 |
| 3,224,178 | 12/1965 | Kennedy | 56/41 |
| 3,292,352 | 12/1966 | Shaw | 56/41 |
| 3,427,791 | 2/1969 | Hubbard | 56/41 |
| 4,484,831 | 11/1984 | Hanson, Jr. et al. | 403/296 X |
| 4,630,431 | 12/1986 | Schlueter et al. | 56/DIG. 24 |
| 4,742,672 | 5/1988 | Orsborn | 56/41 |
| 4,819,415 | 4/1989 | Engelstad et al. | 56/41 |

FOREIGN PATENT DOCUMENTS 778725  11/1980  U.S.S.R. ................................ 56/28

OTHER PUBLICATIONS

Case IH Parts Catalog, "1822 and 1844 Cotton Picker, Jun. 1990, pp. 9A-56, 9A-57".

Primary Examiner—Ramon S. Britts
Assistant Examiner—David J. Bagnell
Attorney, Agent, or Firm—Dressler, Goldsmith, Shore, Sutker & Milnamow, Ltd.

[57] ABSTRACT

A cotton harvesting unit with a cotton doffer assembly rotatable about a vertical axis and including an adjustable drive unit with a vertical drive shaft for imparting rotary motion to and for vertically positioning doffer pads of a doffer unit relative to picker spindles of an adjacent picker rotor. The drive unit vertically positions the doffer pads through an operative mechanism rotatable about a second axis adjacent to the doffer assembly. A motion converting mechanism converts rotary motion of the operative mechanism into linear motion of the dri.e unit drive shaft. The drive shaft of the drive unit and doffer unit are releasably interconnected to each other to facilitate repair/replacement of the doffer unit. To inhibit contaminants for encumbering adjustment of the drive unit, the motion converting mechanism is wholly arranged within the housing assembly and protected from the ambient environment in which a harvester is operated. The lower end of the doffer assembly is rotatably supported by a doffer support. An access post is vertically arranged adjacent to doffer assembly to add strength and rigidity to the doffer support. The access post is movable to an open position to facilitate access to the doffer assembly while maintaining cotton conveying structure in association with the harvesting unit.

17 Claims, 4 Drawing Sheets

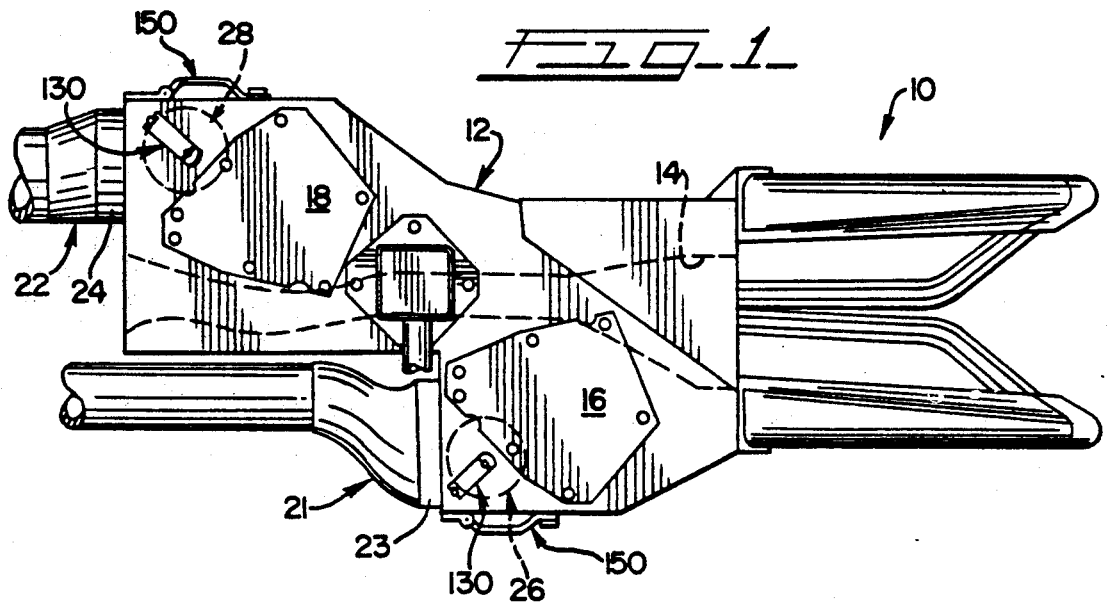
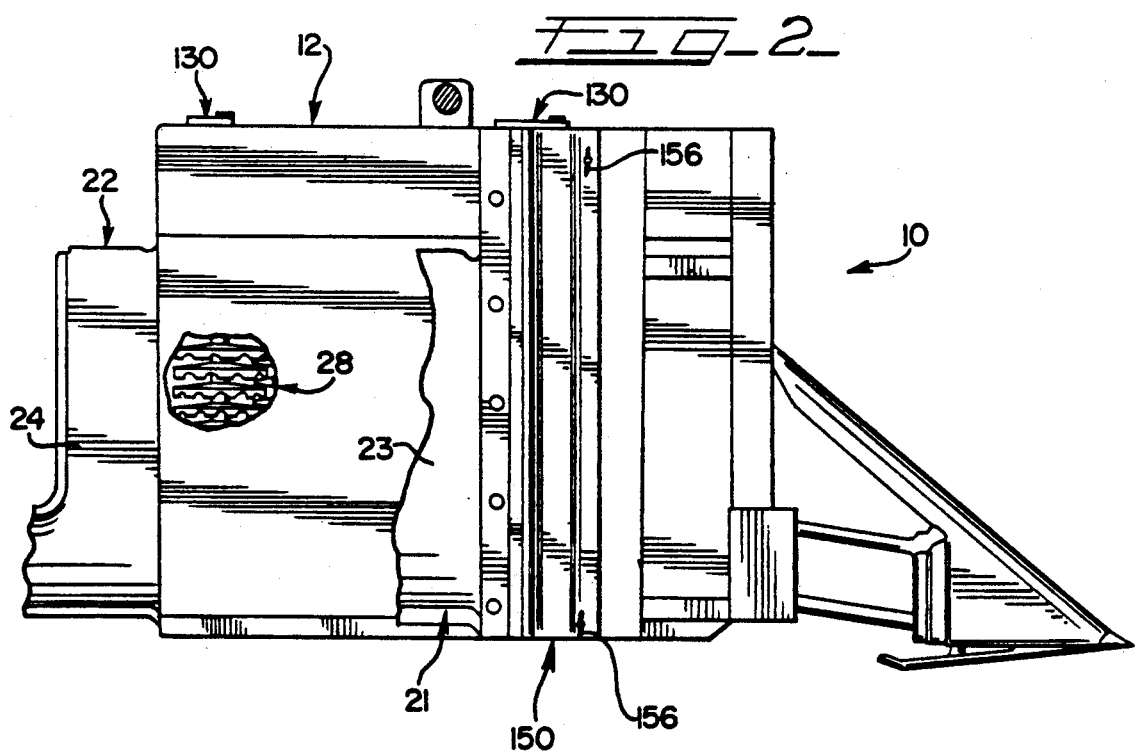

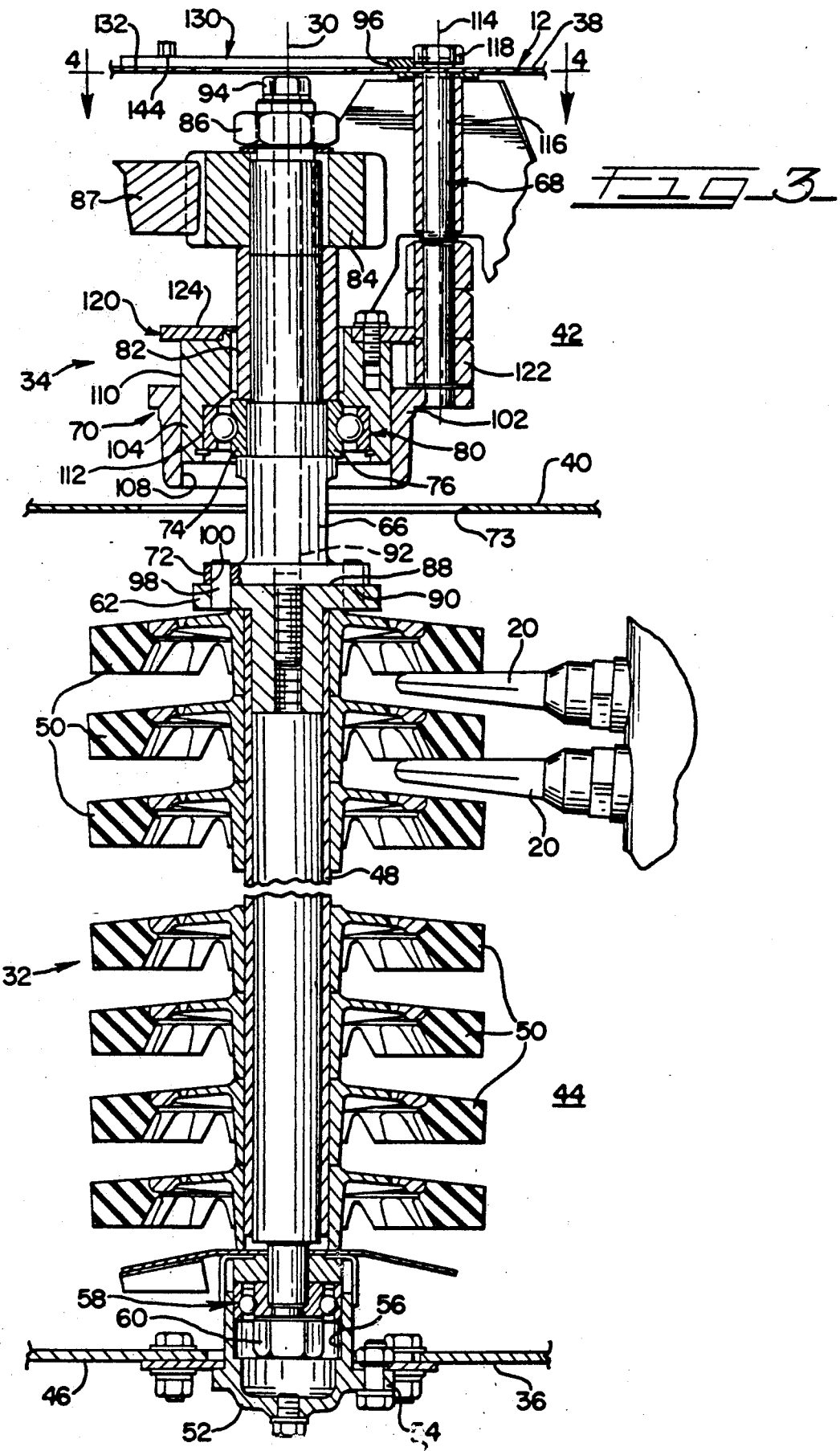

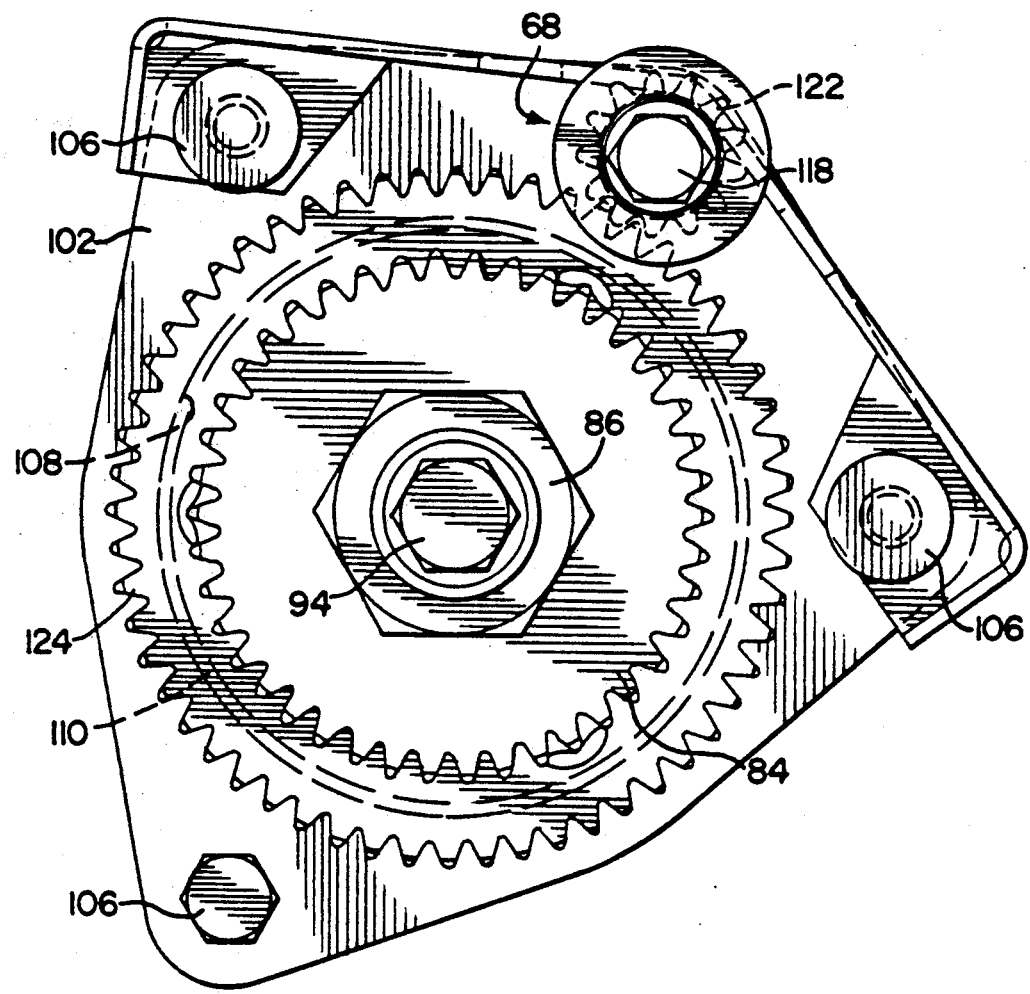
FIG_4
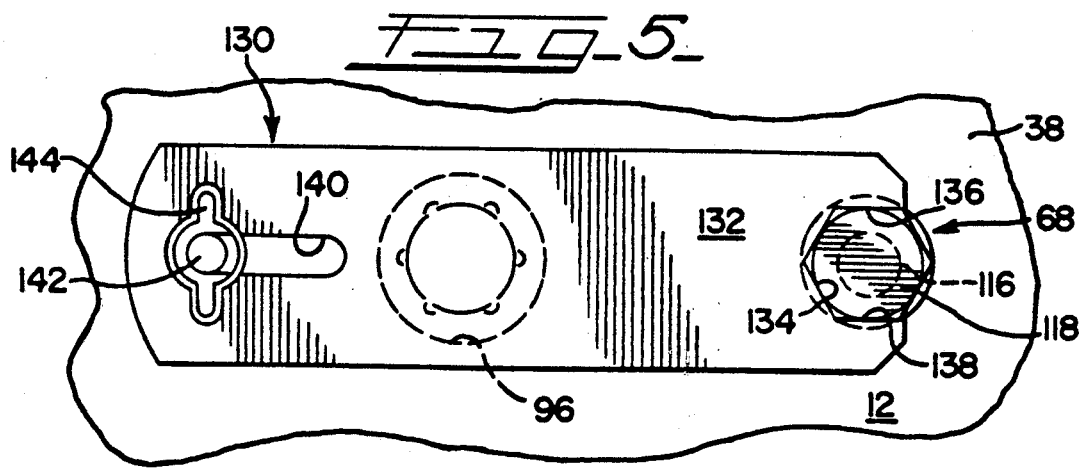
FIG_5

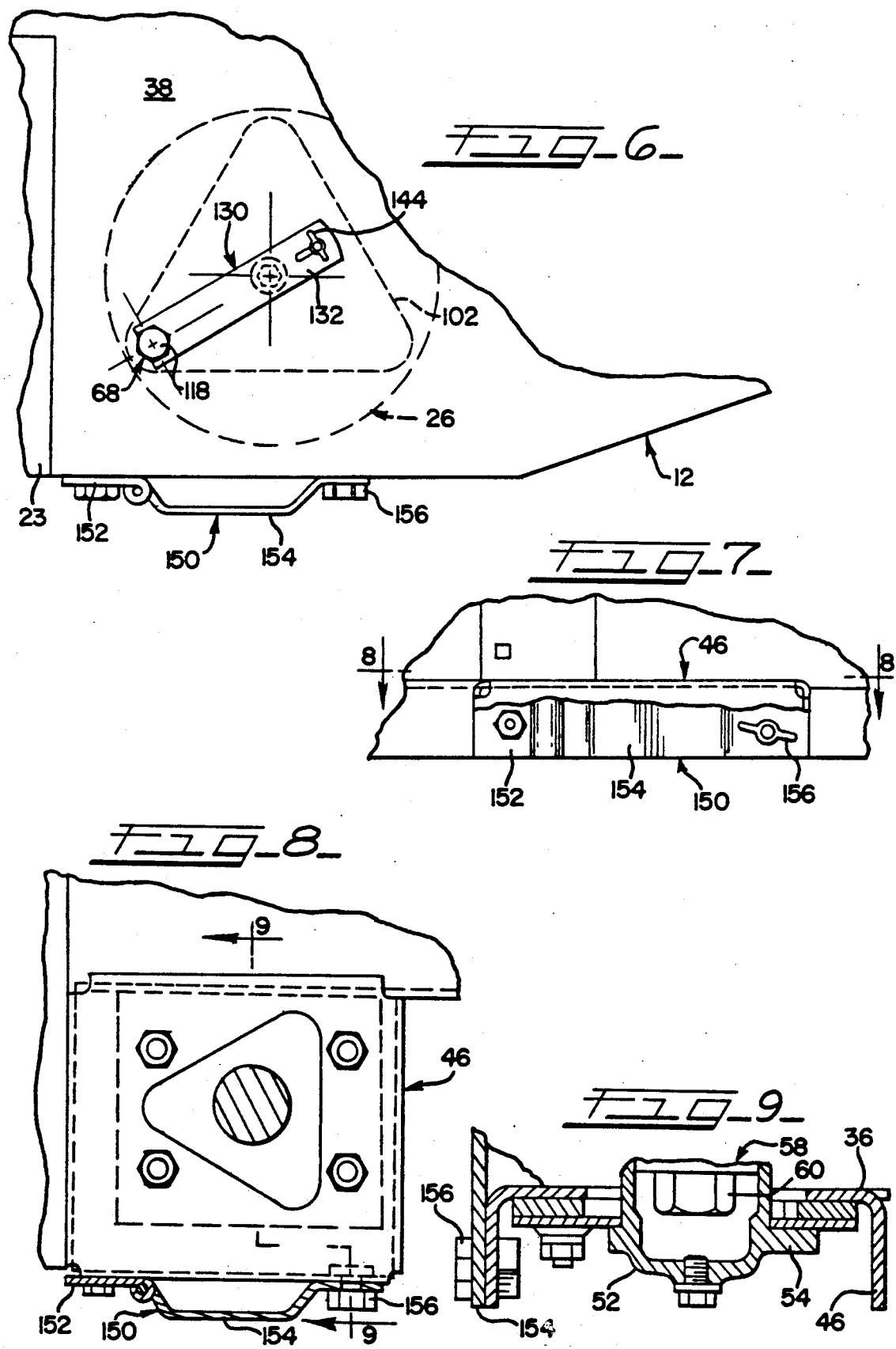

DOFFER ASSEMBLY FOR A HARVESTING UNIT OF A COTTON HARVESTER

FIELD OF THE INVENTION

The present invention generally relates to cotton harvesters and, more particularly, to a cotton harvesting unit with an improved doffer station.

BACKGROUND OF THE INVENTION

A conventional cotton harvester includes two or more harvesting units arranged in side-by-side order at a front end of the harvester. Each harvesting unit typically includes a pair of picker rotors and a pair of doffer assemblies arranged in a complementary relationship with each other within a housing assembly.

Each picker rotor of a harvesting unit includes a plurality of vertically spaced rows of picker spindles. The picker spindles are systematically inserted into a row of cotton plants to entwine or snag cotton from the plants. The picking spindles, with the cotton wound thereon, are then led out of the path of the cotton plants to a doffer station defined by the respective doffer assembly. At the doffer station, the doffer assembly removes or strips the cotton from the spindles. The doffed cotton flows into a conventional cotton conveying structure which directs the cotton away from the harvesting unit.

A typical doffer assembly is rotatably arranged within the housing assembly of the harvesting unit adjacent to a picker rotor and includes a doffer unit and a drive unit. Both the doffer and drive units are provided with a vertical shaft. Flanged ends of the respective vertical shafts are secured to each other intermediate opposite ends of the doffer assembly. The flanged shaft ends are typically secured together by a series of circumferentially spaced releasable fasteners such as bolts or the like.

The doffer unit of each doffer assembly typically includes a series or stack of vertically spaced doffer elements or pads. The doffer pads are intermeshed with the rows of picker spindles and are in closely spaced substantially parallel relationship therewith so that they sweep over the spindles to dislodge the cotton therefrom. The doffer pads are typically formed of rubber, or a like elastomeric material, and during use they gradually wear away.

The proper spacial relationship between the doffer pads and the picker spindles is critical for proper performance of the harvesting unit. In most field conditions, the doffer assembly is vertically positioned through adjustment of the drive unit and such that the doffer pads just touch the picker spindle surface for proper removal of harvested cotton therefrom. Some field conditions, however, may require an interference between the doffer pad and the picker spindle surface to effect complete doffing of the cotton and maximized performance of the picking operation. The relationship between the doffer pads and the picker spindle surface changes in a short time period as the doffer pads wear away on the surface of the spindles and the contact or interference setting is lost. If the doffer assembly is not adjusted to vertically reposition the doffer pads, the picker spindles will wrap with cotton lint and lose their affinity for cotton thereby adversely effecting the picking operation.

Conventional doffer assemblies allow for periodic adjustment by the operator to accommodate for wear of the doffer pads. It has heretofore been known to provide the drive unit with a screw-type adjustment arrangement to manually move the doffer unit in a vertical direction to vertically position or locate the doffer pads relative to the picker spindles. To provide access thereto, the adjustment arrangement usually projects upwardly from the housing. Albeit provides access, the upwardly projecting adjustment arrangement mechanically and visually clutters the top surface of the harvesting unit and exposes the components of the adjustment arrangement to the ambient environment in which the harvester is operated. Accordingly, the screw-type adjusting arrangement is subject to corrosion, dust, dirt and other contaminants which complicate and encumber adjustment of the doffer assembly. Adding a protective cap to cover the screw-type adjustment mechanism only further complicates and makes the adjustment more tedious and difficult especially during a period when picking time is a premium concern of the operator.

Although adjustable to compensate for doffer wear, conventional doffer assemblies can be adjusted within only a limited range. Eventually, the extended wear on the doffer pads mandates replacement of the doffer unit. Notwithstanding the necessity, replacement of the doffer unit is a tedious, difficult and laborious process. The problem with replacing the doffer unit is accentuated by a lack of both visual and physical access to the fasteners which secure the flanged ends of the drive unit and doffer unit to each other. As will be understood, the housing assembly in which the doffer unit is rotatably arranged offers only limited space in which the operator is permitted to work. The intermeshed, closely spaced and substantially parallel relationship of the doffer pads with the picker spindles further complicates removal of the doffer unit from the picker housing.

The vertical axis about which the doffer assembly rotates is substantially parallel to the vertical axis of an adjacent picker rotor. A lower end of the doffer assembly is supported on a cantilevered doffer support. If the doffer support becomes tipped, the parallel relationship between the doffer assembly and the picker unit will be offset resulting in uneven wear on the doffer pads and spaces defined between the doffer pads and spindles resulting in incomplete doffing of the cotton from the spindles. According, a vertical support or post is arranged adjacent the doffer assembly and connected at its lower end to the doffer support. Although adding rigidity and strength to the doffer support, both the support post and cotton conveying structure extending from the housing assembly further complicate removal of the doffer assembly therefrom.

It is, therefore, desirable to provide a doffer assembly with a screw-type adjustment mechanism which readily facilitates adjustment of the spacial relationship between the doffer pads and the picker spindles and which is protected from the ambient environment in which the harvester operates. This would eliminate the dust, dirt and other corrosive elements from encumbering the adjustment mechanism and provide an improved aesthetic appearance for the harvesting unit. Moreover, the housing assembly and doffer assembly should be designed to enhance service accessibility thereto.

SUMMARY OF THE INVENTION

In view of the above, and in accordance with the present invention, there is provided a cotton doffer assembly including an adjustable drive unit for imparting rotary motion to and capable of vertically positioning doffer pads of a doffer unit relative to picker spindles of a harvesting unit. A cotton conveying structure is positioned relative to the doffer assembly to receive and direct doffed cotton away from a housing assembly of the harvesting unit. Arranging the adjustable drive unit within the harvesting unit protects it from contaminants in the ambient environment in which the harvester operates. The doffer and drive units are releasably interconnected to each other from atop the doffer assembly to enhance servicing thereof. Moreover, an access post is provided on the housing assembly to facilitate servicing and, when necessary, repair/replacement of the doffer assembly while maintaining the cotton conveying structure in cotton conveying relation to the housing assembly of the harvesting unit.

The cotton harvester includes a frame supported on wheels for movement across a cotton field having parallel rows of cotton plants. In a conventional manner, the harvesting units are connected to a forward end of the frame for vertical movement between raised and lowered positions. Each of the harvesting units includes a pair of rotatably arranged picker rotors including a plurality of vertically spaced rows of picker spindles thereon. The housing assembly of each harvesting unit further includes a center plate, which, in combination with top and bottom surfaces of the housing assembly, defines a lubricated drive chamber and a cotton chamber, respectively, within the housing assembly.

The doffer unit of the doffer assembly is disposed wholly within the cotton chamber of the housing assembly and rotatably supports a lower end of the doffer assembly. The doffer unit includes an upright shaft. A lower end of the shaft is supported on the housing assembly to allow for endwise vertical movement along and for rotation about a vertical axis of rotation. The doffer unit further includes a plurality of vertically spaced doffer pads which are arranged along the shaft and are intermeshed with the rows of picker spindles for removing cotton therefrom.

The drive unit of the doffer assembly is arranged in axially aligned relation with the doffer unit for endwise vertical movement along and for rotation about the same vertical axis. The drive unit rotatably supports an upper end of the doffer assembly within the lubricated drive chamber and is provided for vertically positioning the doffer unit such that the spindle wiping relation between the doffer pads and the picker spindles can be adjusted and maintained. The drive unit comprises a vertical drive shaft, an operative mechanism for adjusting the drive unit, and a motion converting mechanism for interconnecting the operative mechanism and the drive shaft of the drive unit.

The drive and doffer units are releasably interconnected to facilitate replacement of the doffer unit. The drive shaft of the drive unit is elongated and hollow and is arranged for movement along and rotatable about the vertical axis of the doffer assembly. In a preferred embodiment, a flanged lower-end of the drive unit is interconnected to an upper flanged end of the vertical shaft of the doffer unit from atop the doffer assembly by an elongated rotatable connector. The rotatable connector passes from an upper end and through the drive unit for drawing the flanged ends of the drive and doffer units flanges into releasable contact. Confronting faces on the flanged ends of the doffer and drive units define cooperative instrumentalities which prevent relative rotation between the doffer and drive units while allowing for axial separation of the units to facilitate servicing of the doffer assembly upon release of the rotatable connector. In one embodiment, such cooperative instrumentalities include a series of circumferentially arranged and vertically disposed pins which extend from a flanged end of one of the shafts and which are slidably received within complementary apertures defined by the flanged end of the opposite unit.

The operative mechanism for vertically adjusting the drive unit and thereby positioning the doffer pads on the doffer unit relative to the picker spindles preferably includes an elongated rotatable member which extends up from the lubricated chamber and through the housing assembly about a second vertical axis arranged adjacent to the vertical axis of the doffer assembly. To enhance the aesthetic appearance of and reduce clutter on the top of the harvesting unit, only an upper head portion of the elongated rotatable member extends upwardly through the harvesting assembly.

For positively positioning the doffer unit with respect to the picker spindles, the elongated rotatable member of the operative mechanism is interconnected with the motion converting mechanism of the drive unit through a gear set. The head portion of the elongated rotatable member is releasably secured by a locking mechanism provided atop the housing assembly for selectively locking the operative mechanism. When released, the locking mechanism also acts as a tool for facilitating rotation of the elongated rotatable member and thereby eliminating the need for tools in adjustment of the drive unit.

The motion converting mechanism of the drive unit is a screw-type adjustment mechanism including a pair of adjustment members which are wholly disposed within the lubricated drive chamber of the housing assembly to reduce their exposure to the ambient environment in which the harvester operates. The pair of adjustment members are coaxially arranged about the drive shaft with the first adjustment member being held stationary relative to the housing assembly and a second adjustment member being linearly positioned and moved in response to rotational movement thereof relative to the first adjustment. The linear position of the second adjustment member determines the vertical location of the drive shaft of the drive unit and thereby the vertical location of the doffer pads with respect to the picking spindles on the picking rotor. In a preferred embodiment, a bearing is located in the stationary adjustment member for vertical adjustment relative thereto and for rotatably supporting the drive shaft of the drive unit.

In a conventional manner, the lower end of the doffer assembly is rotatably supported by a cantilevered doffer support. To maintain a parallel relation between the vertical axis of the doffer assembly and the vertical axis of the picker rotor, the doffer support is stabilized by an access post. With the present invention, the access post is movable between closed and open positions. In a closed position, the access post is releasably secured to and adds strength and rigidity to the doffer support. Releasable fasteners maintain the post in a closed position. In its open position, the access post provides enhanced visual and mechanical access to the doffer assembly from the side of the housing assembly to facilitate service and/or replacement of the doffer assembly while maintaining the cotton conveying structure in a cotton conveying relation with the housing assembly. As will be appreciated, the ability to gain access to the doffer assembly while maintaining the cotton conveying structure in cotton conveying relation with the housing assembly will save the operator time during the harvesting operation where time is at a premium. In the preferred embodiment, the access post is hingedly connected to the housing assembly for movement between open and closed positions.

Numerous other advantages and features of the present invention will be become apparent from the following detailed description of the invention, the claims and from the accompanying drawings.

BRIEF DESCRIPTION OF THE DRAWINGS

FIG. 1 is a top plan view of a cotton harvesting unit incorporating principles of the present invention;

FIG. 2 is a side elevational view of the harvesting unit with a side wall of a housing assembly being partially broken away to illustrate a series of doffer pads forming part of a doffer assembly rotatably mounted therein;

FIG. 3 is a longitudinal sectional view of a doffer assembly incorporating principles of the present invention;

FIG. 4 is a top plan view taken along line 4—4 of FIG. 3;

FIG. 5 is a top plan view of a locking mechanism used in combination with the present invention;

FIG. 6 is an enlarged plan view of portion of the harvesting unit illustrating an access post in a closed position;

FIG. 7 is a fragmentary side elevational view of a lower end of the access post;

FIG. 8 is a view taken along like 8—8 of FIG. 7; and

FIG. 9 is a sectional view taken along line 9—9 of FIG. 8.

DETAILED DESCRIPTION OF THE PRESENT INVENTION

While the present invention is susceptible of embodiment in various forms, there is shown in the drawings a presently preferred embodiment hereinafter described with the understanding of the present disclosure is to be considered as an exemplification of the invention and is not intended to limit the invention to the specific embodiment illustrated.

A conventional cotton harvester includes at least two cotton harvesting units usually connected side-by-side to a forward end of a frame of the harvester. Typically, the harvesting units are individually connected to the frame for vertical movement between lowered and raised positions. Since each of the harvesting units are substantially identical, and for purposes of succinctness and brevity, only one such harvesting unit will be described and shown herein with the understanding that the other harvesting units are similarly constructed and operated.

Referring now to the drawings, wherein like reference numerals indicate like parts throughout the several views, there is shown a harvesting unit 10 which includes a housing assembly 12 defining a plant passage 14 which allows a row of cotton plants to pass therethrough. A pair of picker rotors 16 and 18 are rotatably arranged within the housing assembly 12. Each picker rotor includes a plurality of vertically spaced rows of cotton picking spindles 20 (FIG. 3).

As illustrated in FIGS. 1 and 2, each harvesting unit 10 further includes cotton conveying structures 21 and 22 for directing cotton away from the housing assembly. In the illustrated embodiment, the cotton conveying structures 21 and 22 include upright cotton receiving chambers 23 and 24, respectively, which extend rearward from and are arranged approximate to the housing assembly 12 of the harvesting unit 10.

Each harvesting unit further includes doffer assemblies 26 and 28 arranged approximate to the picker rotors 16 and 18, respectively, for removing or doffing cotton from the pickers spindles of the picker rotors. Since each of the doffer assemblies are substantially identical, and for purposes of succinctness and brevity, only doffer assembly 26 will be described in detail herein with the understanding that doffer assembly 28 is substantially similar thereto.

Turning now to FIG. 3, each doffer assembly is rotatable about a vertical axis 30 and includes a doffer unit 32 and an adjustable drive unit 34. The doffer and drive units 32 and 34, respectively, are rotatably arranged between opposite bottom and top surfaces 36 and 38, respectively, of the housing assembly 12. As illustrated, the housing assembly 12 further includes a center plate 40. A lubricated drive chamber 42, wherein the drive unit 34 is located, is defined between top surface 38 and the center plate 40. A cotton chamber 44, wherein the doffer unit 32 of the doffer assembly 30 is arranged, is defined between the center plate 40 and the bottom surface 36 of housing assembly 12.

At its lower end, and as will be discussed in detail hereinafter, the doffer unit 32 is rotatably connected to and supported on a doffer support 46. In the illustrated embodiment, the doffer unit 32 includes a vertical shaft 48 with a series of doffer pads 50 arranged thereon. The shaft 48 extends upwardly from the bottom of the housing assembly. The lower end of shaft 48 is mounted to the doffer support 46 by means of an upwardly opening cup structure 52 having radial flanges 54 suitably secured to the support 46. The cup structure 52 has an internal annular extending face 56 which linearly guides a bearing structure 58 disposed at the lower end of the shaft 48. The bearing 58 is secured to the lower end of the shaft 48 by means of a bolt 60 which locks the bearing 58 on the shaft 48. At its opposite end, shaft 48 is provided with a centrally threaded flange 62 fixedly connected thereto.

As illustrated in FIG. 3, the doffer pads 50 are vertically spaced along the length of the shaft 48 such that each pad 50 is intermeshed between and in a generally parallel relationship with the picking spindles of a respective picker rotor. Each doffer pad 50 is formed of a material such as natural or synthetic rubber and is secured to the shaft 48 in any convenient manner as by splines or clamping thereto.

The adjustable drive unit 34 rotatably supports an upper end of the respective doffer assembly within the lubricated drive chamber 42 of the housing assembly 12 and includes a drive shaft 66, a rotatably arranged operative mechanism 68 for adjusting the vertical location of the drive shaft 66, and a motion converting mechanism 70 for converting rotary motion of the operative mechanism 68 into linear movement of the drive shaft 66. Notably, the drive shaft 66 and the motion converting mechanism 70 are arranged within the lubricated drive chamber 42 to protect them from dust, dirt and moisture commonly found in the ambient environment in which the harvester normally operates.

The elongated drive shaft 66 of the adjustable drive unit 34 is axially aligned with shaft 48 of the doffer unit 32. Shaft 66 has a generally hollow configuration with a flanged lower end 72 which extends through an opening 73 defined by the center plate 40 and is interconnected to the flange 62 on the doffer unit 32. Axially spaced from its flanged end 72, drive shaft 66 defines an annular seat 74 against which a lower edge of an annular inner race 76 of a bearing 80 abuts. A spacer sleeve 82 extends upward from an upper edge of the bearing 80 and surrounds the shaft 66. The upper end of shaft 66 is ensleeved by a drive gear 84 which abuts against an upper edge of the sleeve 82 and has a spline connection with the shaft 66. The bearing 80, sleeve 82 and gear 84 are held against axial movement along the length of the shaft 66 by means of a nut 86 which is threaded onto an upper end of the shaft 66. A rotatably driven input gear 87 transfers rotary motion to gear 84 and, thereby, to shaft 66.

The doffer unit 32 and drive unit 34 are interconnected to inhibit relative rotation therebetween yet readily allow axial separation and replacement of the doffer unit with minimal time and effort. As illustrated in FIG. 3, faces 88 and 90 on the flanges 62 and 72, respectively, are releasably held in confronting relation by an elongated rotatable connector 92 which extends through the hollow drive shaft 66 from atop the doffer assembly. In a preferred embodiment, the elongated connector 92 passes through the drive shaft 66 and is threadably engaged with the flanged end 62 on the vertical shaft 48 of the doffer unit 32. A head portion 94 of the connector 92 is accessible through an opening 96 defined by the housing assembly and which is generally aligned with the vertical axis of the doffer assembly for drawing the flanges 62 and 72 toward each other.

Cooperative instrumentalities defined by the flanges 62 and 72 on the shafts 48 and 66, respectively, prevent relative rotation between the doffer and drive unit 32 and 34, respectively. In a preferred embodiment, such cooperative instrumentalities include a series of vertically and circumferentially arranged pins 98 which extend upwardly from flange 62 and are slidably received in complementary apertures 100 defined by the lower flanged end 72 of the drive shaft 66.

In the illustrated embodiment, the motion converting mechanism 70 is a screw-type adjustment mechanism including first and second adjustment members 102 and 104, respectively. As illustrated, the adjustment members 102 and 104 are wholly arranged within the lubricated drive chamber 42 of housing assembly 12 to reduce their exposure to ambient environment in which the harvester operates and thereby facilitates adjustment of the doffer assembly.

As illustrated in FIGS. 3 and 4, the first and second adjustment members 102 and 104 are coaxially arranged about the drive shaft 66 of the drive unit 34. The first adjustment member 102 is held stationary by a series of fasteners 106 to the housing assembly 12 in the lubricated drive chamber 42. The adjustment member 102 defines an internally threaded portion 108. The second adjustment member 104 defines an externally threaded portion 110 which is threadably received within the threaded portion 108 of member 102 so as to be linearly movable in response to rotational movement thereof. The outer race 112 of bearing 80 is seated within a lower end of the second adjustment member 104 for rotational and linear movement therewith.

The operative mechanism 68 for adjusting the location of the doffer assembly within the housing 12 extends upwardly through the housing assembly and rotates about a second vertical axis, generally indicated by reference numeral 114, provided adjacent to the vertical axis 30 of the doffer assembly. The operative mechanism 68 includes an elongated rotatable member 116. The rotatable member 116 is supported for rotational movement by the stationary adjustment member 102 of the motion converting mechanism 70. The upper end of the rotatable member 116 defines a generally hexagon head portion 118 which extends beyond the top surface 38 of the housing assembly. In the preferred embodiment, and as illustrated in FIG. 3, the head portion 118 of rotatable member 116 is the only portion of the doffer drive unit 34 that extends above the top surface 38 of the housing assembly.

A gear set 120 rotationally joins the rotatable member 116 to the motion converting mechanism 70 of the doffer assembly drive unit. The gear set 120 includes an axially elongated drive gear 122 which intermeshes at its periphery with a driven gear 124. The drive gear 122 is axially secured between the ends of the rotatable member 116 for rotation therewith. The drive gear 124 is secured to the upper end of the adjustment member 104 of the motion converting mechanism 70. The axial elongation of the drive gear 122 allows the adjustment member 104 to linearly move with respect to adjustment member 102 while maintaining gears 122 and 124 in rotatable engagement relative to each other.

Each doffer assembly further includes a locking mechanism 130 provided atop the housing assembly 12 for selectively locking the operative mechanism 68 to the housing assembly in a manner inhibiting rotation thereof and thereby inhibiting linear movement of the doffer assembly along its axis of rotation 30. As illustrated in FIGS. 3 and 5, the locking mechanism 130 includes an elongated generally thin and flat locking member 132 which lies atop and generally parallel to the top surface 38 of the housing assembly 12. In the illustrated embodiment, the flat locking member 132 extends over and covers the access opening 96 defined in the top of the housing assembly to inhibit dirt, debris and other contaminants from inadvertently falling into the lubricated drive chamber 42 of the housing assembly.

At one end, the locking member 132 is preferably configured with an open-ended slot 134 with generally parallel side walls 136 and 138 which are joined to each other. The side walls of 136 and 138 of slot 134 are spaced apart a distance generally corresponding to the distance measured across flats on the hexagon head portion 118 of the rotatable member 116 of operative mechanism 68.

At its other end, locking member 132 preferably defines an elongated slot 140 which receives an externally threaded pin 142 extending upwardly from the top surface of the housing assembly. A suitable locking wing nut 144 or other suitable device is threaded onto the pin 142 to releasably fasten the locking member 132 to the housing assembly and thereby inhibit rotation of the operative mechanism 68 thus inhibiting linear movement of the doffer assembly.

As will be appreciated, the vertical axis 30 of the doffer assembly extends generally parallel to the vertical axis of an adjacent picker rotor. The parallel relationship between the axes of the doffer assembly and picker rotor is primarily affected by the orientation of the doffer support 46. The doffer support 46 of each doffer assembly is held rigidly in place by an access post 150 which is movable between open and closed positions to facilitate service access to the doffer assembly.

As illustrated in FIGS. 6 through 9, the access post 150 is designed as a hinge structure with one member 152 being secured to the housing assembly 12 and the second member 154 being hingedly connected to the first member 152. Fastening members 156, such as wing nuts, releasably secure the upper end of member 154 to the housing assembly 12 and a lower end of member 154 to the doffer support 46. The rigidity of the first and second members 152 and 154 inhibit the doffer support 46 from shifting and thereby maintains the generally parallel relationship between the doffer assembly and the adjacent harvesting unit.

During a harvesting operation, the drive gear 84 of the doffer assembly drive unit 34 is rotated by means of a suitable driving member such as input gear 87. Because the drive gear 84 is spline connected to drive shaft 66, the rotational movement imparted to the drive gear 84 is also imparted to the drive shaft 66 and, ultimately, to the doffer unit 32 of the doffer assembly. Simultaneously, the picker spindles laden with cotton are moved under the doffer pads 50 which forcibly remove the cotton therefrom. The cotton removed from the picker spindles is directed away from the harvesting unit by the duct structures 21 and 22.

During the harvesting operation, the cooperative relationship between the doffer assembly and the picker spindles 20 causes the doffer pads 50 to wear. The present invention allows for quick and efficient adjustment of the doffer assembly to compensate for such wear of the doffer pads. When it is necessary to adjust the doffer assembly, the locking mechanism 130 is released as by unfastening the wing nut 144.

The locking mechanism 130 serves a dual function. When secured to the housing assembly, the locking mechanism 130 locks the operative mechanism 68 against rotation relative to the doffer assembly. Therefore, the linear position of the doffer drive shaft 66 and, ultimately, the doffer pads 50 will be fixed relative to the spindles until it is desired to readjust the vertical location of the pads 50. Upon release of the locking mechanism 130, however, the slotted locking member 132 may be used as an open-end wrench for adjusting the operative mechanism 68 and thereby eliminating the need for additional tools. Rotational movement of the operative mechanism 68 about the vertical axis 114, which is adjacent to the axis 30 of the doffer assembly, is transmuted into linear motion of the drive shaft 66 through the motion converting means 70.

As will be appreciated, rotational movement of the elongated member 116 of the operative mechanism 68 also causes rotational movement of the drive gears 122 and 124. Rotational movement of the drive gears imparts rotational movement of the second adjusting member 104 relative to the fixed adjusting member 102 of the mechanism 70. Relative rotation between member 104 and member 102 results in linear displacement of the member 104 and, thereby, linear displacement of the drive shaft 66 relative to the housing assembly. Linear movement of the drive shaft 66 is translated into vertical displacement of the doffer pads 50 so as to adjust for wear thereon.

The elongated axial length of the gear 122 allows for extensive linear movement of the shaft 66 while maintaining engagement between the gears of the gear set 120. Upon achieving the desired vertical location for the doffer pads, the locking member 132 of the locking mechanism 130 is secured to the housing assembly 12 so as to lock the operative mechanism 68 against further rotation. Therefore, the position of the drive shaft 66 and thereby the vertical location of the doffer pad 68 will be fixed relative to the spindles until it is desired to readjust the vertical location of the pads 50.

Notably, the motion converting mechanism 70 is housed within the lubricated drive chamber 42 of the housing assembly. As such, the adjustable members 102 and 104 thereof are protected against dust, dirt, fluid moisture and other contaminants which would encumber with proper operation of the doffer assembly.

After extended use, the doffer pads 50 eventually wear sufficiently to mandate replacement of the doffer assembly. Another salient feature of the present invention is that it allows for quick and easy repair/replacement of the doffer unit 32 from the housing assembly of each harvesting unit.

Improved access to the doffer assembly is provided by the access post 150. By simply releasing the fastener means 156, the hinged door member 154 may be moved to an open position thereby allowing access to the doffer assembly while maintaining the cotton conveying structure in cotton conveying relation with the housing assembly.

Removal of the doffer unit 32 from the housing assembly 12 is easily and readily effected from atop the housing assembly. After releasing the locking mechanism 130, access to the elongated rotatable connector 92 is provided from atop the housing assembly through the opening 96. Uncoupling one rotatable connector allows the doffer unit 32 to be axially separated from the drive unit 34. As will be appreciated, the cooperative instrumentalities provided on confronting flanges 62 and 72 of the doffer and drive units 32 and 34, respectively, although inhibiting rotational movement will readily allow axial separation of the units from each other following release of connector 92. Accordingly, the doffer unit 32 may be axially separated from the drive unit and is removed through the opening provided by the access post 150. Insertion of a new doffer unit will likewise be effected in a quick and easy manner by reversing the procedure discussed above.

With the present invention, only the head 118 of the operative mechanism 68 extends above the top surface 38 of the housing assembly. Accordingly, the top of the housing assembly is free of clutter and provides a pleasing aesthetic effect. The releasable locking mechanism 130 secures the operative mechanism 68 against rotation and thereby vertically fastens the doffer pads relative to the picker spindles.

When it is necessary to adjust the doffer pads, however, it is easily effected from atop the housing assembly through use of the locking mechanism 130. Repair/replacement of the doffer unit 132 is also readily affected by releasing it from the drive unit 34 by unfastening the connector 92 from atop the housing assembly. As will be appreciated, the elongated connector 92 of the present invention eliminates the cumbersome problem of aligning the flanged ends and the threaded holes in the units of the doffer assembly and in an area with limited visual and mechanical access. In this regard, the access post 150 readily provides an opening through which access to the doffer assembly is readily achieved. Yet, in its closed position, the access post 150 adds strength and rigidity to the doffer support 46 and maintains the doffer assembly in a proper relationship with the adjacent picker rotor.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A cotton doffer assembly for a harvesting unit including a housing assembly wherein a picker rotor having a plurality of rows of picking spindles is rotatably mounted, said doffer assembly comprising:

a doffer unit disposed wholly within said housing assembly for rotation about a vertical axis and having a plurality of vertically spaced doffer pads positioned adjacent said spindles for removing cotton therefrom; and an adjustable drive unit for imparting rotary motion to said doffer unit, said drive unit comprising a vertically movable drive shaft interconnected to and in axial alignment with the axis of said doffer unit for rotation about and movement along said vertical axis, operative means extending upwardly through said housing assembly and rotatable about a second vertical axis arranged adjacent said vertical axis of said doffer and drive units, and motion converting means arranged wholly within said housing assembly to reduce exposure to ambient environment in which said harvester operates for converting rotary motion of said operative means into linear movement of said shaft and thereby vertically locating the doffer pads of said doffer unit with respect to the spindles on the picker rotor.

2. The cotton doffer assembly according to claim 1, further including elongated rotatable connector means extending in alignment with the vertical axis of said doffer unit for releasably fastening the doffer and drive units to each other, and cooperative means provided on said doffer and drive units for inhibiting relative rotation therebetween while allowing axial separation of said doffer and drive units following release of said connector means.

3. The cotton doffer assembly according to claim 1 wherein said motion converting means includes a pair of adjustment members coaxially arranged within said housing assembly to reduce their exposure to the ambient environment in which the harvester operates and about said drive shaft, with a first adjustment member being held stationary relative to said housing assembly and a second adjustment member being linearly positioned and moved in response to rotation thereof and relative to said first adjustment member, the linear position of said second adjustment member determining the vertical location of said drive shaft of said drive unit and thereby the vertical location of said doffer pads with respect to the spindles on the picker rotor.

4. The cotton doffer assembly according to claim 1 wherein said operative means comprises an elongated rotatable member accessible from atop and depending within said housing assembly, and wherein said drive unit further includes gear means for interconnecting said elongated rotatable member and said motion converting means.

5. The cotton doffer assembly according to claim 1 further including locking means provided atop said housing assembly for selectively locking said operative means to said housing assembly in a manner inhibiting rotation thereof about said second vertical axis.

6. A cotton doffer assembly for a cotton harvesting unit having a housing assembly providing opposite top and bottom surfaces, a picker rotor supported in said housing assembly and including a plurality of rows of picking spindles thereon, said cotton doffer assembly comprising:

a doffer unit rotatably connecting and supporting a lower end of said doffer assembly in said housing assembly, said doffer unit comprising a vertical shaft extending upwardly from the bottom surface of said housing assembly and having a plurality of vertically spaced doffer pads arranged thereon to be independently adjacent to said picking spindles for removing cotton therefrom;

an adjustable drive unit including a drive shaft disposed beneath said top surface of said housing assembly to reduce its exposure to ambient environments in which the cotton harvester is operated, said drive unit being axially aligned with said doffer unit to rotatably support an upper end of said doffer assembly and for vertically positioning said doffer unit such that the doffer pads are arranged in a wiping relation to said picking spindles; and means for interconnecting said doffer unit and said drive unit, said interconnecting means including elongated rotatable connector means accessible from a top surface of said housing assembly for axially drawing opposite ends of said doffer and drive units toward each other and releasably securing said drive unit to said doffer unit, and cooperative means on said drive and doffer units for automatically locking the adjustable drive unit drive shaft to the doffer unit shaft to prevent relative rotation therebetween when opposing faces on said shafts are drawn into confronting relation by said connector means, said cooperative means allowing for axial separation of the units to facilitate servicing of the doffer assembly upon release of said connector means.

7. The cotton doffer assembly according to claim 6 wherein a lower end of said doffer unit is rotatably supported by a cantilevered doffer support, and wherein an access post extends vertically alongside said doffer assembly and is movable between a closed position wherein said post braces a free end of said doffer support and an open position wherein said post is positioned to allow access to said doffer assembly.

8. The cotton doffer assembly according to claim 7 further including releasable locking means for maintaining said post in said closed position.

9. A cotton doffer assembly for a cotton harvesting unit having a housing assembly providing opposite top and bottom surfaces, a picker rotor supported in said housing assembly and including a plurality of rows of picking spindles thereon, said cotton doffer assembly comprising:

a doffer unit rotatably connecting and supporting a lower end of said doffer assembly in said housing assembly, said doffer unit comprising a vertical shaft extending upwardly from the bottom surface of said housing assembly and having a plurality of vertically spaced doffer pads arranged thereon to be independently adjacent to said picking spindles for removing cotton therefrom;

an adjustable drive unit disposed beneath said top surface of said housing assembly to reduce its exposure to ambient environments in which the cotton harvester is operated, said drive unit being axially aligned with said doffer unit to rotatably support an upper end of said doffer assembly and for vertically positioning said doffer unit such that the doffer pads are arranged in a wiping relation to said picking spindles, wherein said adjustable drive unit includes an endwise movable drive shaft connected to said doffer unit, a stationary support surrounding said shaft and disposed wholly beneath said top surface of said housing assembly, a bearing located in the stationary support for vertical adjustment relative thereto and rotatably supporting the shaft, the vertical adjustment of said bearing determining the endwise position of said drive shaft, and bearing support means rotatably interconnected with said stationary support for vertically adjusting the bearing in response to rotational movement and thereby influencing the vertical position of said doffer unit; and means for interconnecting said doffer unit and said drive unit, said interconnecting means including elongated rotatable connector means for axially drawing opposite ends of said doffer and drive units toward each other and releasably securing said drive unit to said doffer unit, and cooperative means between confronting faces of said drive and doffer units for preventing relative rotation therebetween while allowing for axial separation of the units to facilitate servicing of the doffer assembly upon release of said connector means.

10. The cotton doffer assembly according to claim 9 wherein said stationary support and said bearing support means are threadably interconnected to each other.

11. The cotton doffer assembly according to claim 9 wherein said adjustable drive unit further includes a gear set for rotationally interconnecting said bearing support means with operative means rotatably operated and accessible from atop said housing assembly.

12. The cotton doffer assembly according to claim 11 further including locking means for releasably securing said operative means against rotation.

13. A cotton doffer assembly for a cotton harvester unit having a housing assembly with top and bottom surfaces which are separated by a center plate to define a lubricated drive chamber between said center plate and said top surface and a cotton chamber between said center plate and said bottom surface, and a rotatably driven picker rotor supported in said housing assembly and including a plurality of rows of picking spindles thereon, said cotton doffer assembly comprising:

a doffer unit arranged within said cotton chamber for endwise vertical movement along and for rotation about a vertical axis, said doffer unit comprising a vertical shaft rotatably supported by and extending upwardly from a support surface and having an upper flanged end, said doffer unit further including a plurality of vertically spaced doffer pads arranged along said shaft adjacent to said picking spindles for removing cotton therefrom; and an adjustable drive unit for rotatably supporting an upper end of said doffer assembly within said lubricated drive chamber and for vertically positioning said doffer unit such that the doffer pads are in spindle wiping relation to the picking spindles, said drive unit including a driven hollow shaft arranged for movement along and rotatable about said vertical axis and having a lower flanged end abutting with the flanged upper end of said shaft of said doffer unit; and means for interconnecting said doffer unit and said drive unit, said interconnecting means including elongated rotatable connector means centrally passing from an upper end and freely through said drive unit for drawing said flanges into releasable contact, and cooperative means on said flanges for automatically locking the doffer and drive units to each other when said flanges are drawn into contact thereby preventing relative rotation between said units while readily allowing for axial separation of said doffer and drive units to facilitate servicing of the doffer unit upon release of said connector means.

14. A cotton doffer assembly for a cotton harvester unit having a housing assembly with top and bottom surfaces which are separated by a center plate to define a lubricated drive chamber between said center plate and said top surface and a cotton chamber between said center plate and said bottom surface, and a rotatably driven picker rotor supported in said housing assembly and including a plurality of rows of picking spindles thereon, said cotton doffer assembly comprising:

a doffer unit arranged within said cotton chamber for endwise vertical movement along and for rotation about a vertical axis, said doffer unit comprising a vertical shaft rotatably supported by and extending upwardly from a support surface and having an upper flanged end, said doffer unit further including a plurality of vertically spaced doffer pads arranged along said shaft adjacent to said picking spindles for removing cotton therefrom; and an adjustable drive unit for rotatably supporting an upper end of said doffer assembly within said lubricated drive chamber and for vertically positioning said doffer unit such that the doffer pads are in spindle wiping relation to the picking spindles, said drive unit including a driven hollow shaft arranged for movement along and rotatable about said vertical axis and having a lower flanged end abutting with the flanged upper end of said shaft of said doffer unit, wherein said drive unit further includes operative means extending upwardly through said housing and rotatable about a vertical axis arranged adjacent the vertical axis of said doffer unit, and motion converting means arranged wholly within the lubricated drive chamber of said housing assembly for inhibiting exposure to ambient environment in which the cotton harvester is operated and for converting rotary motion of said operative means into linear motion of said driven hollow shaft whereby vertically positioning the doffer pads on said doffer unit with respect to the picking spindles on the picker rotor; and means for interconnecting said doffer unit and said drive unit, said interconnecting means including elongated rotatable connector means passing from an upper end and through said drive unit for drawing said flanges into releasable contact, and cooperative means on said flanges for preventing relative rotation therebetween while allowing for axial separation of said doffer and drive units to facilitate servicing of the doffer unit upon release of said connector means.

15. The cotton doffer assembly according to claim 14 wherein the vertical shaft of said doffer unit is mounted for endwise and rotatable movement in a lower bearing supported by a doffer support.

16. The cotton doffer assembly according to claim 14 wherein said cooperative means of said interconnecting means includes a series of vertically disposed pins extending from said flanged end of the vertical doffer unit shaft and which are slidably received in complementary apertures defined by the flanged end of the driven hollow drive unit shaft.

17. A cotton harvesting unit comprising:
a housing assembly having top and bottom surfaces;
a picker rotor assembly rotatably mounted in said housing assembly, said picker rotor assembly including a plurality of vertically spaced rows of picking spindles;
a doffer assembly rotatably mounted in said housing adjacent said picker rotor assembly, said doffer assembly including an adjustable drive unit supporting an upper end of said doffer assembly for rotational and endwise movement about and along a generally vertical axis extending substantially parallel to said picker rotor assembly, and a doffer unit supporting a lower end of said doffer assembly on a doffer support for rotational and endwise movement about and along said vertical axis, said doffer unit being releasably connected to said drive unit and includes a plurality of vertically spaced doffer pads positioned independently adjacent said spindles for removing cotton therefrom, the vertical location of said doffer pads relative to said spindles being controlled through adjustment of said drive unit;
cotton conveying means extending from said housing assembly for conveying cotton away from said doffer assembly; and
an access post connected to said housing and arranged adjacent said doffer assembly, said access post having a multipiece hinged design with a door of said access post being movable between a releasably closed position wherein said door is connected to and vertically supports said lower doffer support to maintain the substantially parallel relationship between said doffer assembly and said picker rotor assembly and an open position wherein said door is swung outwardly to facilitate access to said doffer assembly and permit servicing of said doffer unit while maintaining said cotton conveying means in a cotton conveying relationship with said housing assembly.

* * * * *